United States Patent [19]

Testa

[11] Patent Number: 5,622,463
[45] Date of Patent: Apr. 22, 1997

[54] CEILING TILE CUTTING TABLE

[76] Inventor: Vincent M. Testa, 56 Newburyport Turnpike, Ipswich, Mass. 01938

[21] Appl. No.: 361,573

[22] Filed: Dec. 22, 1994

[51] Int. Cl.⁶ .................................................. B23C 3/12
[52] U.S. Cl. .................... 409/131; 409/137; 409/138; 182/129
[58] Field of Search ................................. 144/285, 287, 144/286 A, 134 R; 248/236, 238; 451/411, 412, 413, 414; 125/23.01, 35; 409/137, 138; 182/129, 127, 28

[56] References Cited

U.S. PATENT DOCUMENTS

| | | | |
|---|---|---|---|
| 1,429,926 | 9/1922 | Carre. | |
| 3,923,320 | 12/1975 | Favreau et al. | 280/103 |
| 4,409,699 | 10/1983 | Moorhouse | 409/137 |
| 4,877,069 | 10/1989 | Plumley | 144/286 R |
| 4,895,483 | 1/1990 | Anderson | 409/137 |
| 4,986,156 | 1/1991 | McGinnis | 83/467 |
| 5,018,563 | 5/1991 | Yoder | 144/286 A |
| 5,158,023 | 10/1992 | Allen | 108/42 |
| 5,456,559 | 10/1995 | Taylor | 409/137 |
| 5,473,968 | 12/1995 | Break et al. | 144/286 A |

Primary Examiner—M. Rachuba
Assistant Examiner—Christopher Kirkman
Attorney, Agent, or Firm—Don Halgren

[57] ABSTRACT

The present invention comprises a ceiling tile cutting table which can be supported at a slight angle onto the side of a scaffold. The table includes a pair of support rails on one side of the table. The support rails slidingly support a rotatively empowered cutting tool which has a cutting bit extending therebetween. The table may be removed from the scaffold and attached to a set of wheels to permit the table to be mobile while also carrying tiles on the wheel's cross-arm bars therebeneath.

18 Claims, 6 Drawing Sheets

CEILING TILE CUTTING TABLE

BACKGROUND OF THE INVENTION

(1) Field of the Invention

This invention relates to cutting tables and more particularly to tables which can be adapted for the cutting of ceiling tiles.

(2) Prior Art

In the construction industry today the ceiling tiles in buildings are often measured and cut by hand using any available straight edge, such as the side of a second tile, and the razor blade. This type of effort results in mismatched ceiling tiles and having to do the same measurements repetitively for each particular being cut and aligned with a wall against which it may have to mate. Often these operations are done on a scaffold, which makes the work all the more difficult. It is an object of the present invention to provide a ceiling tile cutting table which may be comfortably supported on a scaffold to permit a worker easy access thereto.

It is a future object of the present invention to provide a tile cutting table which is articulable to go from a first scaffold position to a second mobile table configuration.

It is yet a further object of the present invention, to provide a tile cutting table which has means for cutting appropriately these side edges of multiple tiles accurately and easily.

BRIEF SUMMARY OF THE INVENTION

The present invention comprises a multi functional ceiling tile cutting table arranged to be utilized on a scaffold for easy access and consistent cutting of corresponding sides of successive ceiling tiles.

The table comprises a planar member of rectangular shape having a first lower side, a top side, a left edge, and a right edge. The first or lower edge has a pair of legs which extend downwardly there from a pivot axis secured to the table. A pair of inverted generally u-shaped channel hooks are disposed at the upper end of those front legs, so as to engage a horizontal bar which is typical on standard scaffolds. A pair of articulable rear legs extend downwardly pivoting from the bottom side of the upper edge of the table.

When the table is arranged so as to be disposed onto a scaffold, the second or rear legs are disposed at an angle with respect to the table, so as to provide engageable support with the front legs which are held against the scaffold. The front and back legs are secured near their proximal ends so as to hold the cutting table at an angle of about 15 to 40 degrees with respect to the horizontal.

An elongated guide channel is fixedly disposed along the right hand side of the cutting table. The guide channel may comprise a pair of generally parallel spaced apart tubular rails or a U-shaped track having an elongated slot directed longitudinally in its lowermost portion. Both embodiments of the rails or the track slot extends parallel with the right hand edge of the cutting table. The rail embodiment and the track embodiment are arranged to receive a cutting tool which is guided therealong on the rails or within the elongated track. The rails or elongated track embodiments are disposed approximately 1 inch above the surface of the cutting table, so as to permit a ceiling tile to be disposed there-between. The cutting table has a pivotable ruler arranged along its lowermost first edge. The ruler has a pivot point at its right hand end, and is adjustably pivotable through a securement means at the left hand edge of the table. The securement means slides in a groove which is arcuately cut into the surface of the cutting table.

In a further embodiment of the cutting table arrangement, the cutting table may be removed from the scaffold, and the front and rear legs pivoted to a downward configuration. The distal or lower-most edge of each leg may be engaged with a wheel which is also part of a cross-arm frame support arrangement. Each table leg engages a stanchion at the ends of the respective cross arms, so as to permit the table to be mobile. The now mobile table comprises a pair of cross-arms each of which have a pivotable wheel at its end, each wheel being beneath one of the legs of the cutting table. The wheels permit mobility of the table, and the cross-arms permit storage of multiple tiles beneath the table. The table in effect acts as a cutting table as well as a transport cart for multiple tiles.

During use of the table in either of its position on a scaffold, or on its mobile base, a rotary cutting tool may be slideably disposed on a slidable "car" arranged on the rails, or in the elongated support track arranged at the right hand side of the cutting table. The rotary cutting tool extends between the rails or through the elongated slot, depending upon the embodiment, so as to cut tiles consistently and accurately at the angle set by the adjustable ruler at the bottom of the table.

The invention thus comprises a cutting table arrangement for accurately cutting ceiling tiles, comprising a planar tabular element having an upper and a lower surface and having parallel front and back edges and parallel side edges, a pair of supports for attaching one edge of the table to a scaffold, adjacent its front edge; and a tool support arranged adjacent one of the sides to slidably support a cutting tool thereon, wherein the table has a pair of attachable wheel supports which are securable to the legs for conversion of the table from a scaffold table to a mobile table. The tool support preferably comprises a pair of parallel, spaced apart rails for supporting the cutting tool adjacent one edge of the table. The rails comprise tubular members which extent the length of one side of the table. A car is slidably received on the rails, to support the cutting tool thereon. The car has a central opening therein, for receipt of a cutting bit of the cutting tool. A further embodiment comprises a channel shaped track with a slot arranged in the lower part of the channel. An angularly adjustable rule is arranged thereon, to permit tiles placed thereagainst for consecutive corresponding angles or cuts to be made thereacross. The rule is arranged to pivot tiles between the tool support and the upper surface of the table. The supports for attaching one edge of the table to a scaffold comprises an inverted "J" shaped finger arranged at the front side of the table. The cutting tool has an elongated bit rotatively extending therefrom, so as to both cut a tile arranged therebeneath, and to machine a stepped edge simultaneously therealong. A slot may be cut through the table itself, parallel to the right hand side edge, about 2 to 3 cms. in width. This permits the cutting tool to extend therethrough, if the support rails support the cutting tool over the table itself, and not beyond the edge of the table surface. A trough may be disposed beneath the slot in the cutting table, onto which a vacuum source may be attached. The vacuum would be activatable so as to suck away harmful dust from the tiles as they are cut by the cutting tool moving along the support rails or support track.

The invention also comprises a method of cutting ceiling tiles, comprising, attaching a cutting table to a rung of a scaffold so as to support the table ar an angle of about 15 to about 40 degrees with respect to the horizontal, pivoting a pair of legs from the table into secure engagement with a portion of the scaffolding, supporting a cutting tool on a pair of support rails attached parallel to one side of the table and spaced slightly thereabove, and placing a tile to be cut onto a support rule arranged on the table and securing it at a desired angle, so as to permit the accurate cutting of successive tiles placed thereon with correspondingly similar angles. The method includes, removing the table from the scaffolding to which it is attached, pivoting a pair of support legs under the table into a vertical orientation, and attaching a wheeled frame to the distal end of each of said legs to permit the table to be mobile on its own wheels. The method also includes arranging a pair of cross-arms between diagonal wheels on the attached wheel frame, and also placing a plurality of tiles across the cross-arms so as to permit the table to be utilized as a mobile tile carrier.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
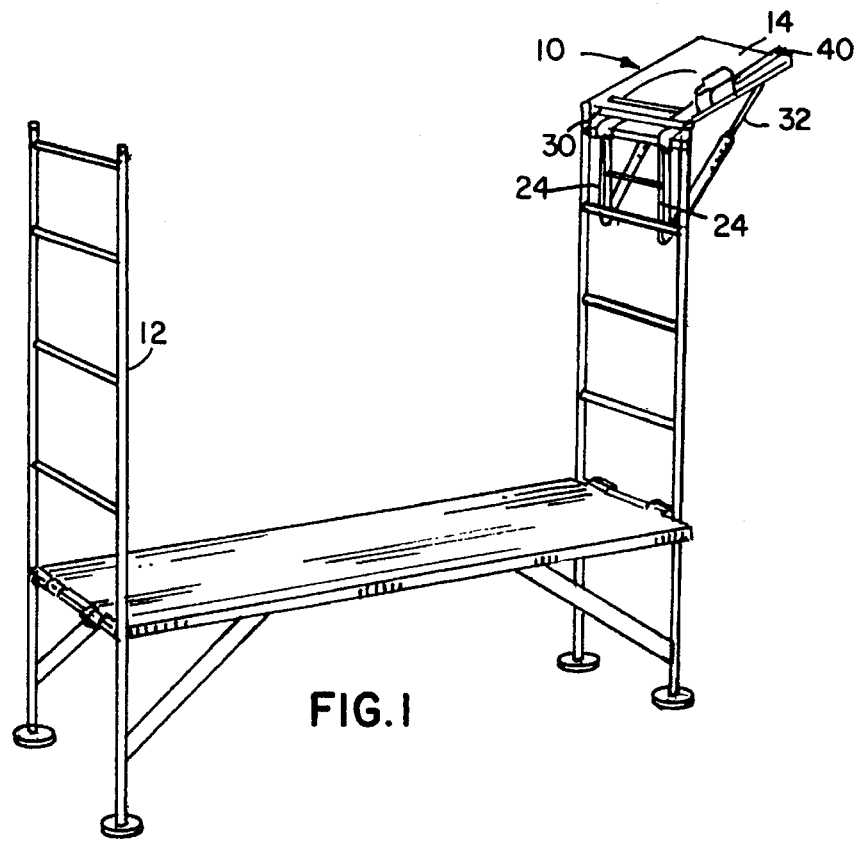
FIG. 1 is a perspective view of a scaffolding and a ceiling tile cutting table thereon.

The present invention comprises a multi-functional ceiling cutting table 10 arranged to be utilized on a scaffold assembly 12 providing easy access and consistent cutting of corresponding sides of successive ceiling tiles, as shown in FIG. 1.

The table 10 comprises a planar member 14 of rectangular shape having a first lower side 16, a top uppermost edge 18, a left edge 20 and a right edge 22. The first or lower side 16 has a pair of legs 24 which extend downwardly therefrom, from a pivot axis 26 secured to the table 10. A pair of inverted generally U-shaped hooks 28 are disposed at the upper end of those front legs 24, so as to engage a horizontal bar 30, shown in section in FIG. 2, which is typical on standard scaffolds 12. A pair of articulable rear legs 32 extend downwardly, pivoting from the bottom side of the upper edge 18 of the table 10, as also shown in FIG. 2.

Figure 2:
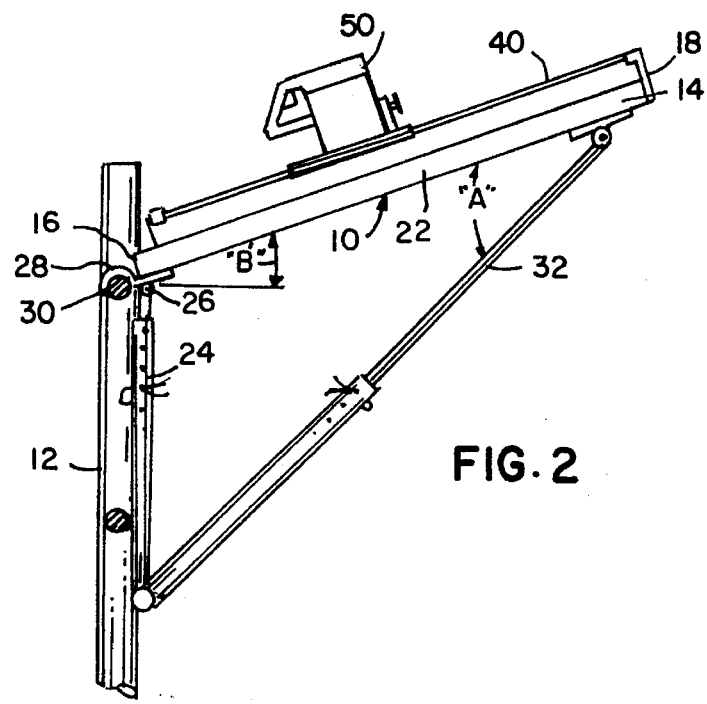
FIG. 2 is a side elevational view of the cutting table arranged at the end of a scaffold.

When the table 10 is arranged so as to be disposed on a scaffold 12, as shown in FIGS. 1 and 2, the second or rear legs 32 are disposed at an angle "A" of about 20 to about 60 degrees with respect to the table 10, so as to provide engageable support with the front legs 24 which are held against the scaffold 12. The front and back legs 24 and 32 are secured near their proximal ends so as to hold the cutting table 10 at an angle "B" of about 15 to 40 degrees with respect to the horizontal to permit the worker easier access to his work surface.

Figure 5:
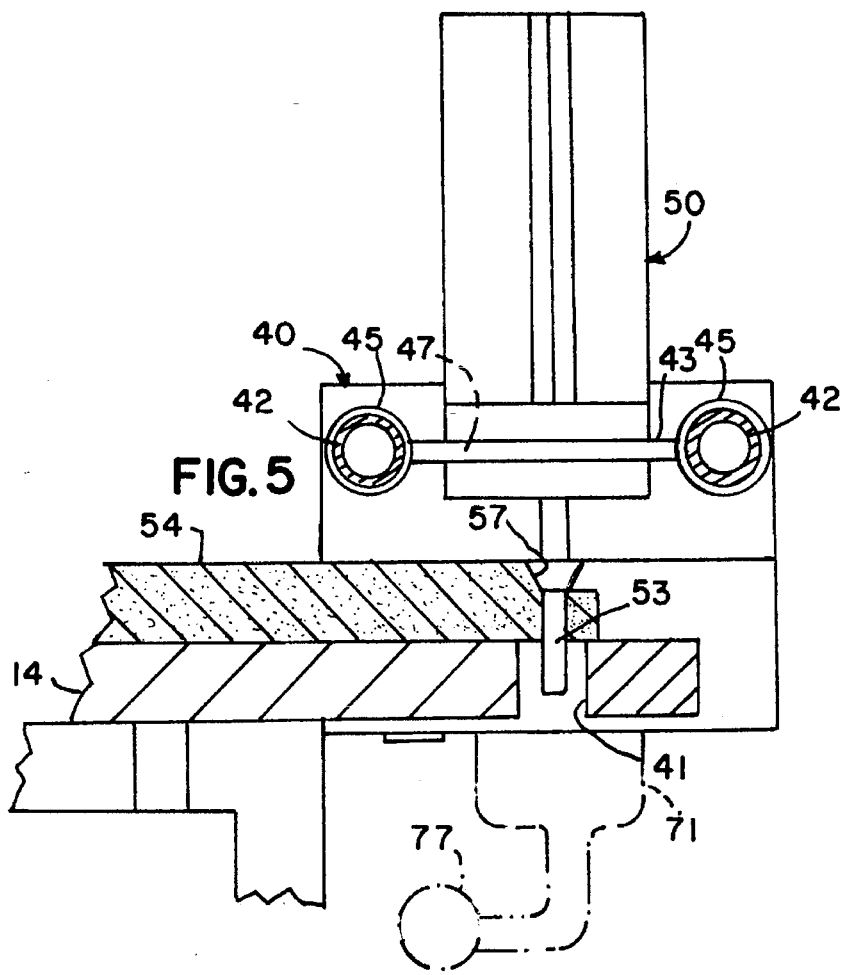
FIG. 5 is a cross-sectional view of the cutting table and the side tool support track thereon

An elongated tool support guide 40 is disposed along the right hand side 22 of the cutting table 10. The support guide 40 preferably comprises a pair of parallel, spaced apart rails 42 having an elongated opening 44 extending therebetween, as shown in FIG. 5. This opening 44 extends parallel with the right end edge 22 of the cutting table 10. In a further embodiment, a slot 41 may be disposed in the table 14, inwardly adjacent the edge 22. A trough 71, shown in dashed lines in FIG. 5, with a vacuum 77 in communication with the trough 71. The trough 71 and vacuum 77 may be arranged to remove the dust from the tool 50 and table 10 when the tool 50 is cutting a tile 54. The rails 42 are arranged to receive a car 43 which supports a rotatively empowered cutting tool 50 which is guided along the rails, as shown in FIGS. 2, 2A, 2B, 3 and 5. The rails 42, it is noted, may be disposed above the table 14 and beyond the right hand egde 22, or the rails 42 may be disposed above the slot 41 cut into the table itself.

Figure 2A:
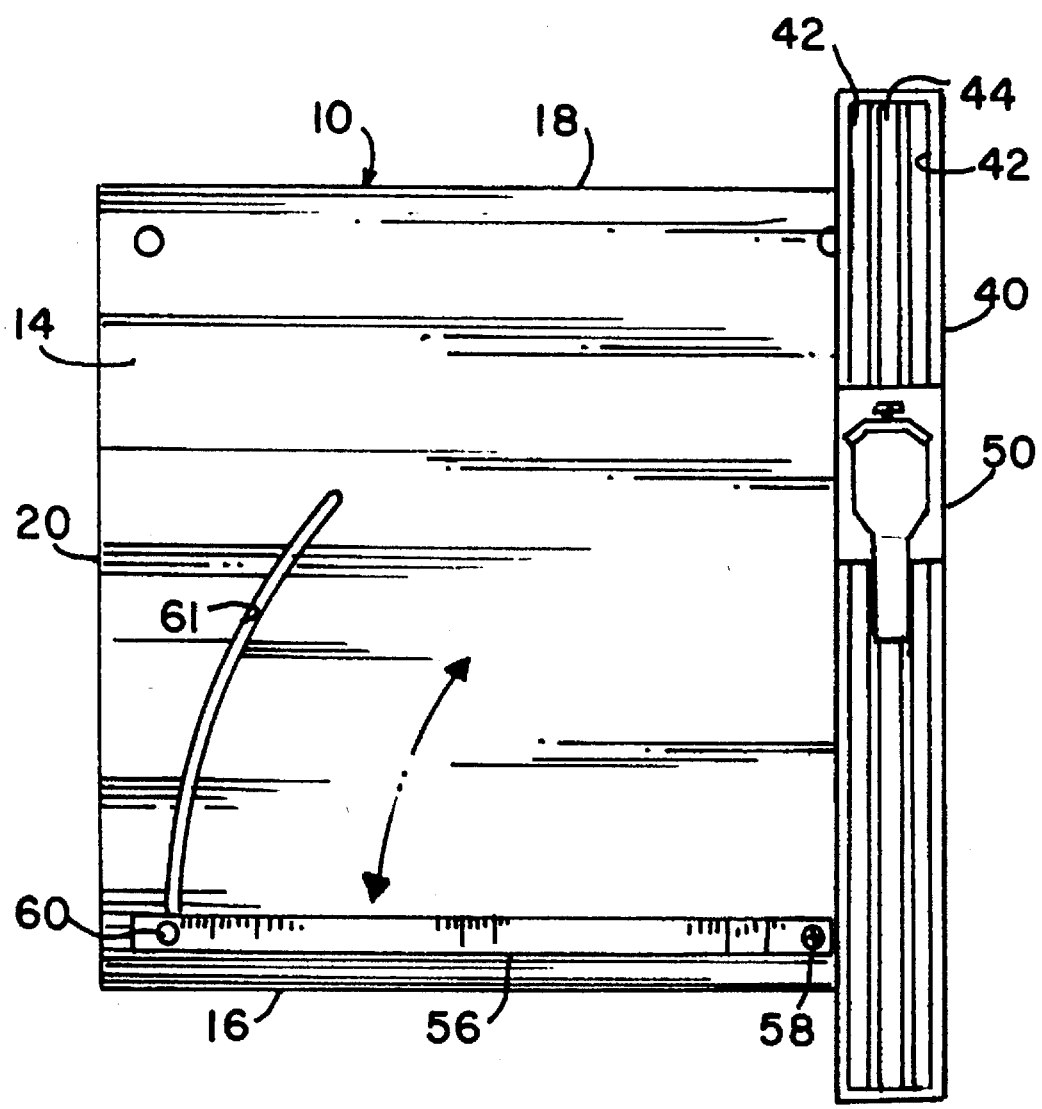
FIG. 2A is a plan view of the cutting table constructed according to the principles of the present invention.
Figure 2B:
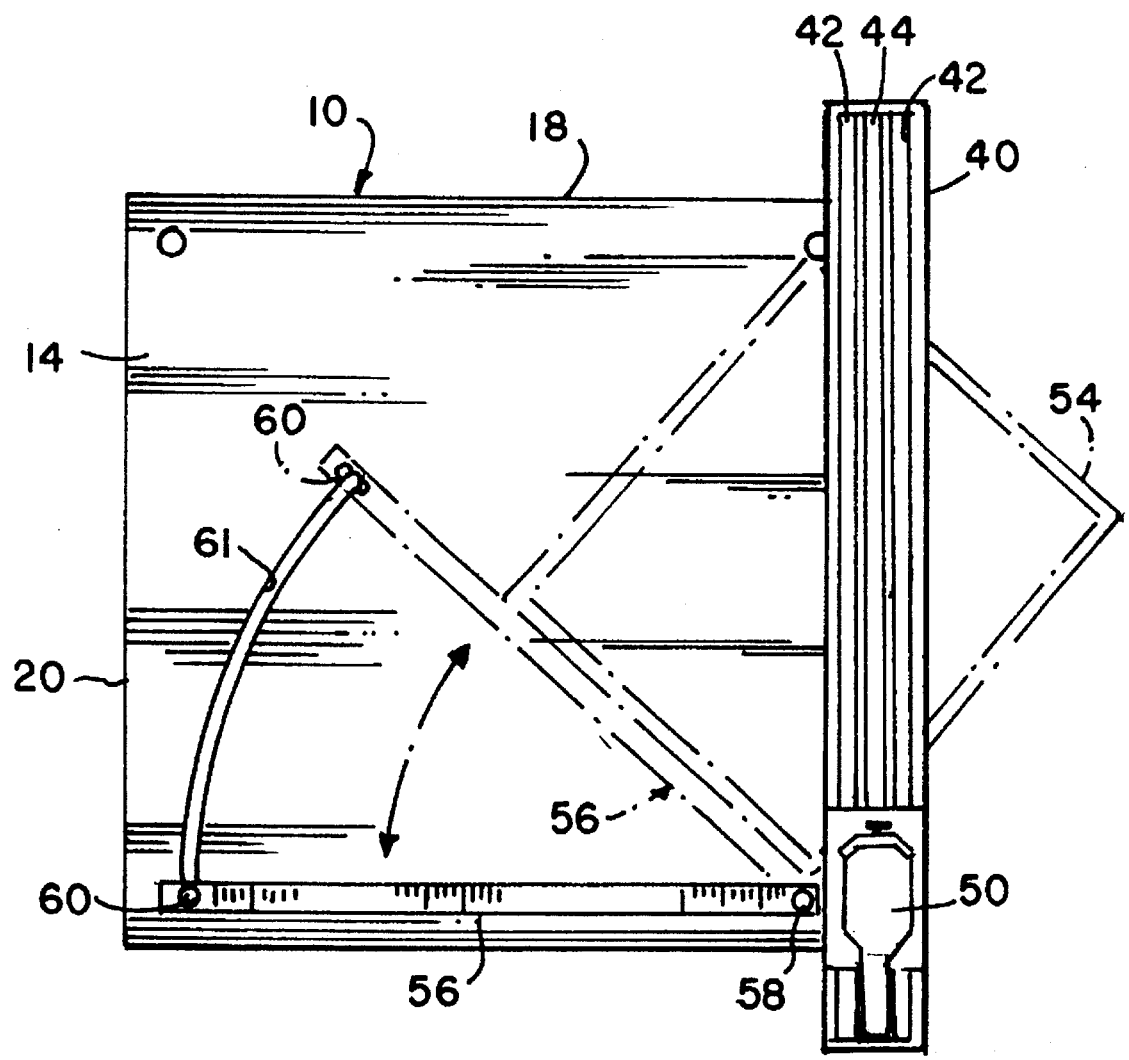
FIG. 2B is a view similar to FIG. 2A showing a tile on the cutting board.
Figure 2C:
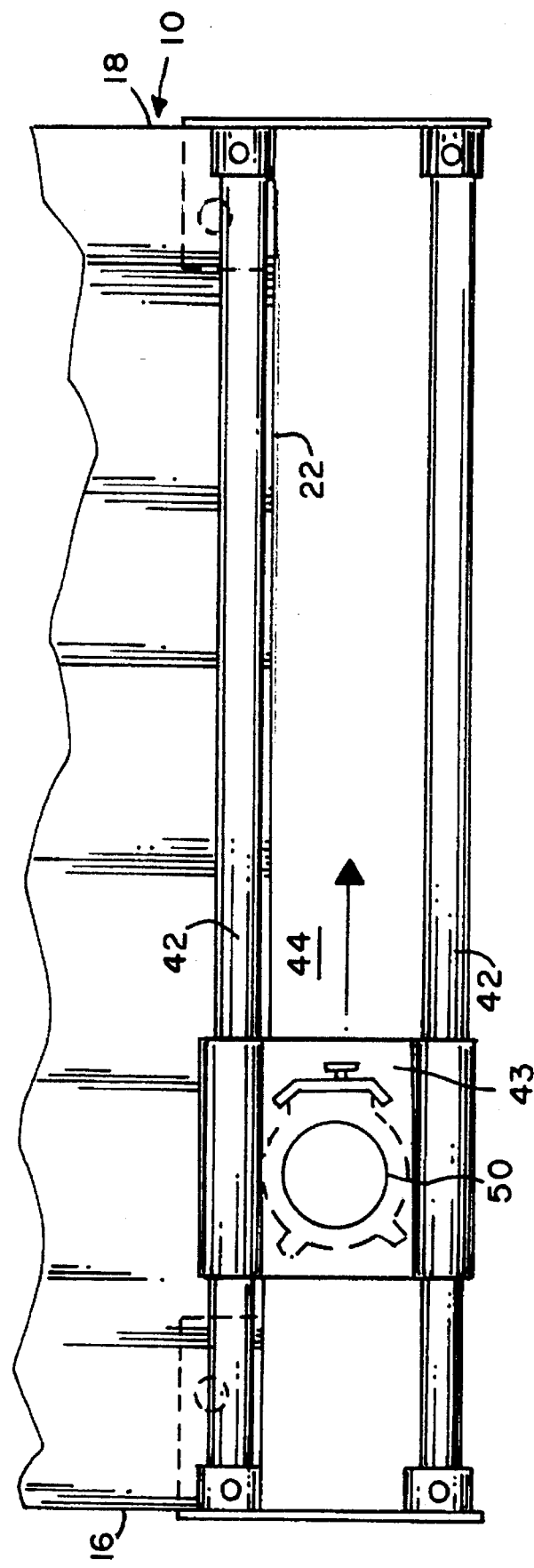
FIG. 2C is a plan view of a portion of the cutting table and the guide channel arrangement thereon.
Figure 2D:
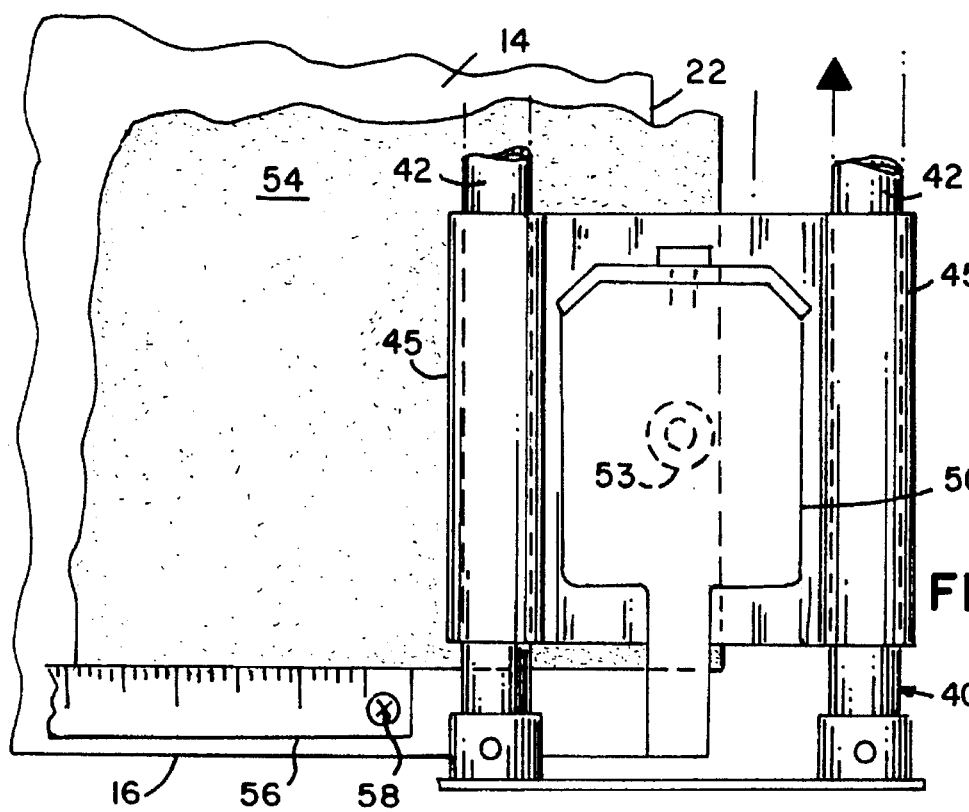
FIG. 2D is a plan view of a portion of the cutting table and tool guide.
Figure 3:
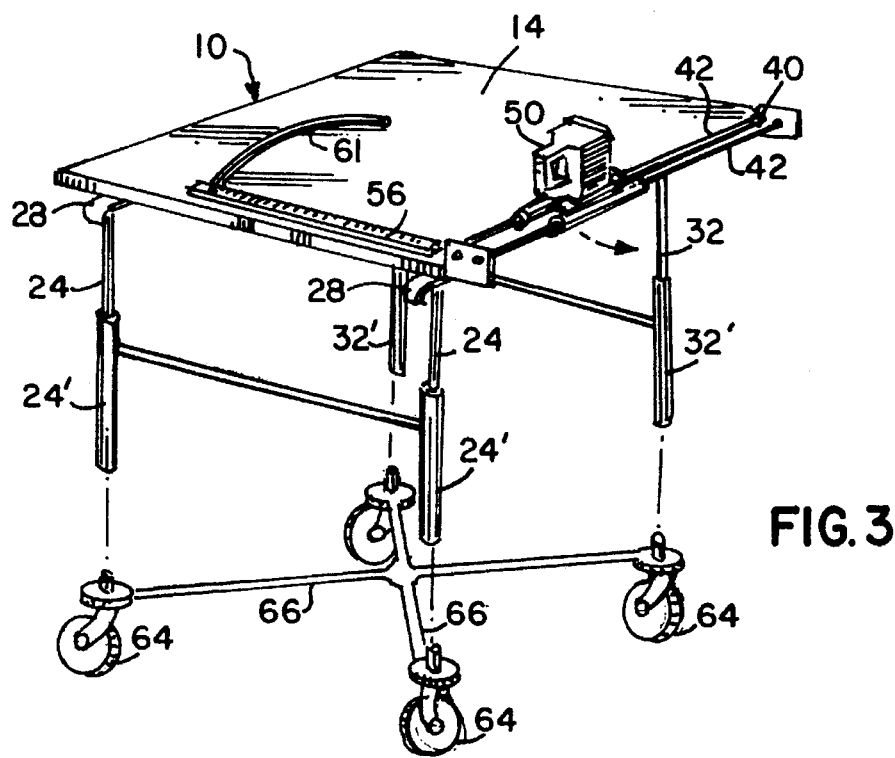
FIG. 3 is an exploded perspective view of the ceiling tile cutting board on a mobile base arrangement.
Figure 4:
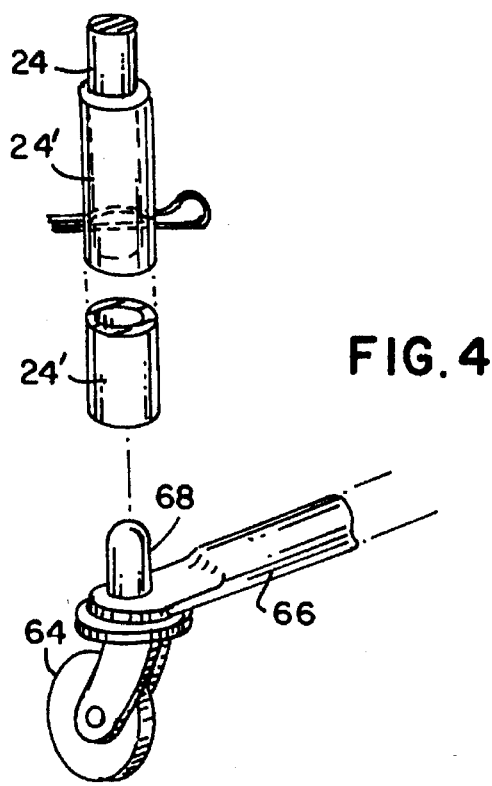
FIG. 4 is a partial exploded view of a portion of the mobile assembly and support leg of the cutting table.

The car 43 has a pair of parallel tubes 45, one of each being slidably disposed about each rail 42, as shown in FIGS. 2C and 2D and FIG. 5. The car 43 is arranged to hold the chassis of the tool 50 approximately 2 to 3 cms above the surface of the cutting table 14, so as to permit a ceiling tile 54 to be disposed between the rails 42 and the table 14. The car 43 has a central opening 47 through which a lower portion of the tool 50 extends, as shown in FIG. 2D.

The tool 50 has a cutting bit 53 which rotates against the tile 54, to cut it and/or put a shoulder 57 thereon, as shown in FIG. 5. The cutting table 10 has a pivotable ruler 56 arranged along its lower- most edge 16, as shown in FIGS. 2A and 2B. The ruler 56 has a pivot point 58 at its right hand side, and is adjustably pivotable through the securement means 60 at the left hand edge of the table 10. The securement means 60 slides in a groove 61 which is arcuately cut into the surface of the cutting table 10.

In a further feature of the cutting table arrangement, the cutting table 10 may be removed from the scaffold 12, and the front and rear legs 24 and 32 pivoted to a downward (vertical) configuration. Each leg 24 and 32 has a lowermost distal portion 24' and 32' which may be engaged with a wheel 64 which is also part of cross-arm frame support arrangement 66. Each table leg 24' and 32' engages a stanchion 68 at the ends of the respective cross-arms 66, so as to permit the table 10 to be mobile. The now mobile table 10 comprises a pair of cross-arms 66, each of which have a pivotable wheel 64 at its end, each wheel 64 being beneath one of the legs of the cutting table 10. The wheels 64 permit mobility of the table 10 and the cross-arms 66 permit storage of multiple tiles beneath the table 10. The table 10 in effect acts as a cutting table as well as transport cart for multiple tiles.

During use of the table 10 in either of its position on a scaffold, or on its mobile base, the rotary cutting tool 50 may be slideably disposed in the elongated support track 40 arranged at the right hand side of the cutting table 10. The rotary cutting tool 50 extends between the support rails and through the elongated slot 44 between the rails 42, so as to cut tiles consistently accurately at the angle set by the adjustable ruler at the bottom of the table.

Thus, what has been shown is a unique arrangement for the cutting of ceiling tiles either on a scaffold assembly or as part of a mobile base which also acts as a cart for the carrying of multiple tiles.

I claim:

1. A cutting table arrangement for accurately cutting ceiling tiles, comprising:

an adjustable planar tabular element having an upper and a lower surface and having parallel front and back edges and parallel side edges;

a pair of supports for attaching a front edge of said table to a scaffold, at a slight angle with respect to the horizontal;

a tool support arranged adjacent one of said side edges to slidably support a cutting tool thereon; and an arrangement of legs and a pair of attachable wheel supports which are securable to said legs for conversion of said table from a scaffold table to a mobile table.

2. A cutting table as recited in claim 1, wherein said tool support comprises a pair of parallel, spaced apart rails for supporting said cutting tool adjacent one edge of said table.

3. A cutting table as recited in claim 2, wherein said rails comprise tubular members which extend the length of one side of said table.

4. A cutting table as recited in claim 3, wherein a car is slidably received on said rails, to support said cutting tool thereon.

5. A cutting table as recited in claim 4, wherein said car has a central opening therein, for receipt of said cutting tool and a cutting bit of said cutting tool.

6. The cutting table as recited in claim 2, wherein said tool support comprises a pair of guide rails having a slot arranged therebeneath, through the lowermost portion of said table, for disposition of a cutting tool therethrough.

7. A cutting table as recited in claim 1, including an angularly adjustable rule thereon, to permit alignment of any tiles placed thereagainst for consecutive corresponding angles or cuts to be made thereacross.

8. A cutting table as recited in claim 7, wherein said rule is arranged to pivot tiles between said tool support and said upper surface of said table.

9. A cutting table as recited in claim 1, wherein said supports for attaching one edge of said table to a scaffold comprise an inverted "J" shaped finger arranged at said front side of said table.

10. The cutting table as recited in claim 9, wherein said tool support extends over the edge of said table to permit a tool bit therewith to move parallel to said edge, and beyond said side of said table.

11. The cutting table as recited in claim 9, wherein said angle of said table is about 15 to about 40 degrees with respect to the horizontal.

12. A cutting table as recited in claim 1, wherein said cutting tool has an elongated bit rotatively extending therefrom, so as to both cut a tile arranged therebeneath, and to machine a stepped edge simultaneously therealong.

13. The cutting table as recited in claim 1, including a slot arranged through said table and parallel to a side edge thereof, to permit said tool bit to extend therethrough during a tile cutting operation thereon.

14. The cutting table as recited in claim 13, including a trough arranged beneath said slot in said table, to contain any dust generated during a tile cutting operation thereon.

15. The cutting table as recited in claim 14, including a vacuum source arranged in communication with said trough, so as to remove any dust from said trough collected during a tile cutting operation on said table.

16. A method of using a multi-position multi-function cutting table, comprising:

attaching a cutting table to a rung of a scaffold so as to support said table at an angle of about 15 to about 40 degrees with respect to the horizontal;

pivoting a pair of legs from said table into secure engagement with a portion of the scaffolding;

supporting a cutting tool on a pair of rails attached parallel to one side of said table and spaced therefrom;

placing a tile to be cut onto a support rule arranged on said table and securing it at a desired angle, so as to permit the accurate cutting of successive tiles placed thereon with correspondingly similar angles;

removing said table from the scaffolding to which it is attached;

pivoting a pair of support legs under said table into a vertical orientation; and attaching a wheeled frame to the distal end of said legs to permit said table to be mobile on its own wheels.

17. The method of claim 16, including:

arranging a pair of cross-arms between diagonal wheels on said attached wheel frame beneath said table.

18. The method of claim 16, including:

placing a plurality of tiles across said cross-arms so as to permit said cross-arms to support said tiles, and therefore permit said table to be utilized as a mobile tile carrier.

* * * * *